July 14, 1925.

Re. 16,112

G. DOTTERWEICH

AUTOMOBILE ENGINE SUPPORT

Original Filed June 13, 1919

R. A. Thomas

Thomas E. Turpin

WITNESSES

George Dotterweich

INVENTOR

BY Victor J. Evans

ATTORNEY

Reissued July 14, 1925. Re. 16,112

UNITED STATES PATENT OFFICE.

GEORGE DOTTERWEICH, OF RICHMOND HILL, NEW YORK.

AUTOMOBILE ENGINE SUPPORT.

Original No. 1,388,104, dated August 16, 1921, Serial No. 303,915, filed June 13, 1919. Application for reissue filed May 15, 1923. Serial No. 639,188.

*To all whom it may concern:*

Be it known that I, GEORGE DOTTERWEICH, a citizen of the United States, residing at Richmond Hill, in the borough of Queens and State of New York, have invented a new and useful Automobile Engine Support, of which the following is a specification.

My invention relates to improvements in engine supports and especially in supports adapted for a certain well known type of engine, when attached to an automobile chassis, in which, more specifically the present form and manner of attachment to the chassis frame is improved and safeguarded, and among the objects of my improvements are:—

To improve the type of automobile-engine support characterized by side arms and a central support adjustably connected with the side arms, by the provision of a construction whereby the side arms may be arranged in snug embracing engagement with the engine structure notwithstanding the utilization of side chassis bars to support said arms, and whereby notwithstanding said snug embracing engagement of the side arms with the engine structure the central support can be conveniently connected in adjustable manner to the side arms.

To the attainment of the foregoing, the invention consists in the improvement as hereinafter described and definitely claimed.

In the accompanying drawings, forming part of this specification:—

Similar numerals refer to similar parts throughout the several views.

Figure 3:
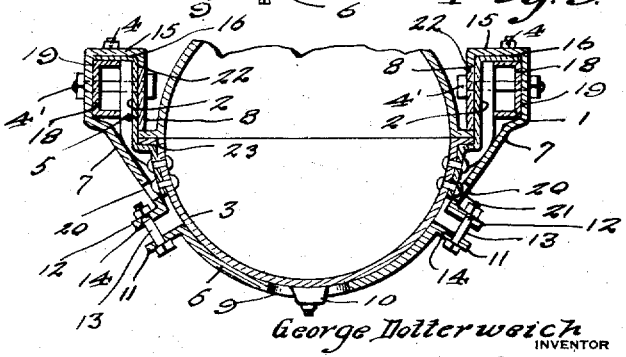
Figure 3 is a cross-sectional view of the engine casing and chassis frame with my appliance attached thereto.
Figure 4:
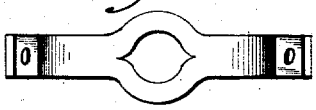
Figure 4 is a plan view of the central portion of my engine support.

The means at present provided for attaching the engine case to the chassis frame 1 of a well known type of car consists of two hanger lugs 2, one of which is riveted and welded to either side of engine case 3, and the free ends of such lugs 2, are arranged upon the chassis frame 1 and are firmly attached thereto by means of bolts 4, as shown in Figure 3, of drawings.

The severe jolts to which every part of an automobile car is subjected have been the means of dislocating the exact position of the engine case by bending or usually breaking one or both of the lugs 2, as indicated at 5, and thereby throwing the engine casing out of proper alinement and causing an interference with the proper working conditions of the engine, in most cases causing a complete breakdown. In order to obviate such breakdowns I have provided a cradle-like support consisting of a lower centrally located cradle 6, and two side arms 7—7, two hold down blocks 8—8, being preferably, though not necessarily also employed.

The entire cradle support is preferably made from strong steel bars or plates and is fashioned to conform exactly to the outer shape of the engine casing 3. An annular opening 9, is provided to permit the oil drain cup 10 of casing 3, to protrude therefrom.

This cradle 6, has on either end an outwardly turned up lip 11.

One end of each side arm 7 is also provided with an outwardly turned lip 12, which lips 12 are designed to be adjustably connected to the lips 11 of saddle 6, preferably by means of bolts 13, which pass through bolt-holes 14, provided for this purpose in the lips 11 and 12.

Figure 1:
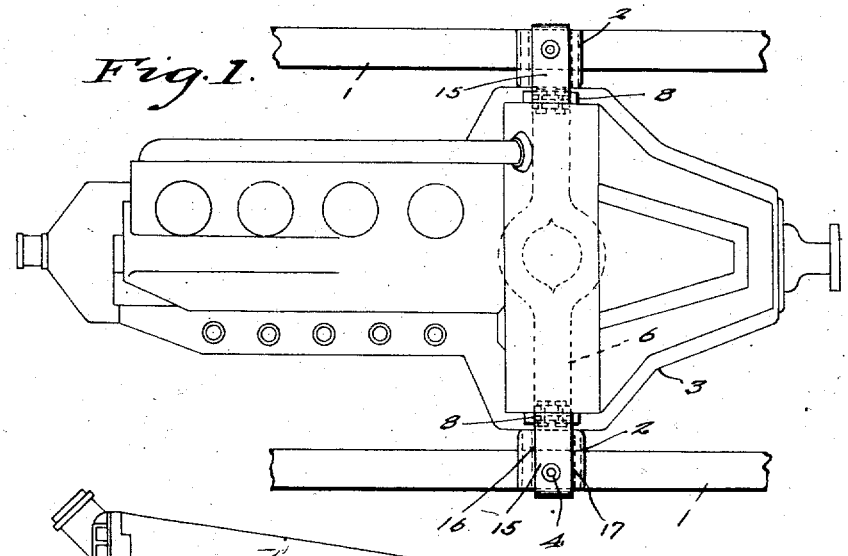
Figure 1 is a plan view of a well known type of engine and engine casing showing my invention applied thereto.
Figure 2:
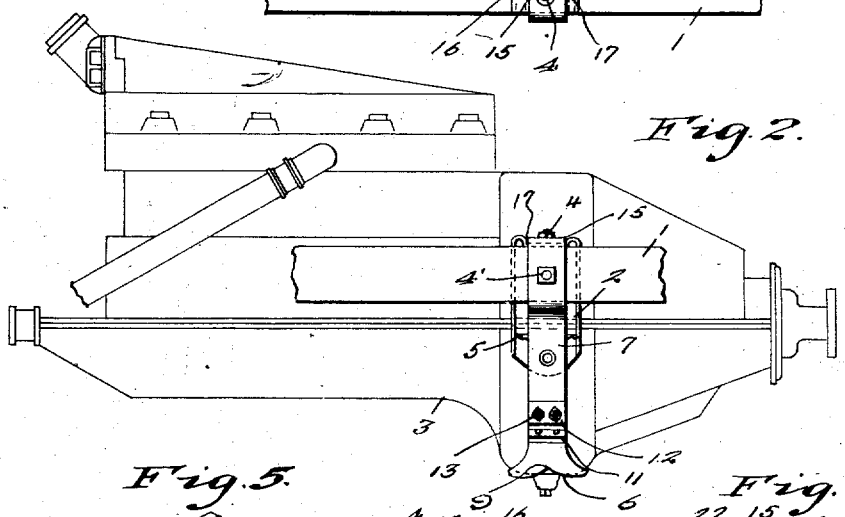
Figure 2 is a side elevation of the same.
Figure 5:
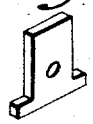
Figure 5 is a perspective of a hold-down plate preferably, though not necessarily, used in conjunction with my invention.

The other and upper end of each side arm 7, has an inwardly extending lip 15, designed to rest upon the upper sides 16 of the permanent hanger lugs 2 of the engine casing 3 and the width and shape of the inwardly extending lip 15 of each side arm 7 is made to coincide with the dimensions and shape of the permanent hanger lug 2, as seen in Figure 2 of drawing where the lip 15 rests snugly and securely within the channeled or grooved portion 17 of hanger lug 2. Manifestly in virtue of this construction the bolts 4 and their complementary nuts may be utilized to secure the lips 15 to the chassis portions. The portion 19 of the side arm 7 rests securely against the outer side 18 of chassis frame 1, and extends downwardly and is in shape coinciding with the outer form of the engine casing 3. Openings 20 are provided to permit existing rivet heads 21 to protrude.

The hold down blocks 8—8 are introduced on the outer sides of the permanent lugs 2 and are of sufficient proportions to snugly fit between the pendent end portions 22 of the lips 15 and the upper sides 23 of the rim of the engine casing.

If now the nuts of the bolts 13 are tightly screwed down the entire safety cradle will hold the engine casing securely in place and the same can be brought back to the proper alinement by the proper and judicious use of the bolts 13 and any fractured pieces similar to 5 as shown in Figure 3 of drawing are thereby firmly retained in place and do not require any immediate replacements, the auxiliary saddle support together with the hold down blocks 8 serving to secure the needed permanent rigidity of the engine casing.

The bolts 4 at present provided in the well known make of car may be removed and other bolts substituted therefor and of sufficient length to pass through bolt holes provided for this purpose in the upper lips 15 of the side arms 2.

It is readily seen that by means of my invention additional support can be provided for the engine casing 3, by making the same a permanent adjunct to the chassis frame.

The side arms 7 may be permanently attached to the chassis frame by means of bolts 4′, with the hold down blocks 8 inserted so as to stiffen the lugs 2 and prevent dislocation of engine casing by jars and jolts, to which the car is subjected. The central cradle 6 may be carried on the journey and used as an additional means of support and for realinement purposes should any necessity arise for this purpose.

It is obvious that instead of flat bars, any other cross-sectional shape such as channel bars or T-iron may be adopted for this purpose in order to provide additional strength for the different parts of my invention.

Manifestly the essential parts of my invention are the two side arms 7 and the central support 6; the side arms being offset inwardly to bring said side arms into snug embracing engagement with the engine structure as is desirable, and the arms and central support being provided with confronting outwardly-extending lips whereby it is convenient for the mechanic to adjustably connect the same together through the medium of threaded bolts or the like, and this notwithstanding the snug arrangement of the arms and the central support against the engine structure.

Having thus described my invention, what I claim is:—

1. An automobile engine support comprising a cradle formed of a central support 6, side arms 7, inwardly extending lugs 15, hold down blocks 8 introduced between the upper surface of the outer rim of the engine casing and the nether side of the projecting inwardly extending lugs 15 of the cradle, and tightening bolts 13, as and for the purpose herein set forth.

2. The combination of an engine case, chassis bars at opposite sides of the same, a central support, lugs connected to the case and resting at the inner sides of the chassis bars anl having horizontal portions on said bars, and side arms resting at the outer sides of the chassis bars and extending downwardly and inwardly relative to said side bars below the same and having lower portions connected to the central support and also having upper inwardly extending portions arranged over the horizontal portions of the lugs and terminating in pendent end portions arranged at the inner sides of the vertical portions of the lugs, whereby said lug portions are interposed between the inner sides of the chassis bars and the pendent end portions of the side arms.

3. The combination of an engine case, chassis bars at opposite sides of the same, a central support, lugs connected to the case and resting at the inner sides of the chassis bars and having horizontal portions on said bars, and side arms resting at the outer sides of the chassis bars and on said horizontal portions of the lugs and having upper pendent end portions at the outer sides of the lugs and also having lower end portions converging below the chassis bars and connected to the central support; the said engine case being provided with a rim, and hold-down blocks secured in position between said rim and said pendent upper end portions of the arms.

4. The combination of an engine case, chassis bars at opposite sides of the same, a central support, lugs connected to the case and resting at the inner sides of the chassis bars and having horizontal portions on said bars, and side arms resting at the outer sides of the chassis bars and extending downwardly and inwardly relative to said side bars and having lower portions connected to the central support and also having upper inwardly extending portions arranged over the horizontal portions of the lugs and terminating in pendent end portions arranged at the inner sides of the vertical portions of the lugs, and hold down blocks secured in position below said pendent inner end portions of the arms.

In testimony whereof, I affix my signature.

GEORGE DOTTERWEICH.